Figure 6:
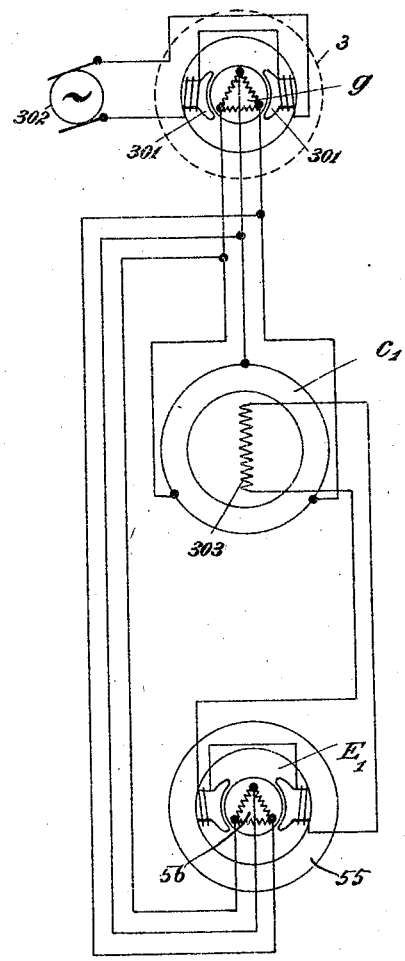

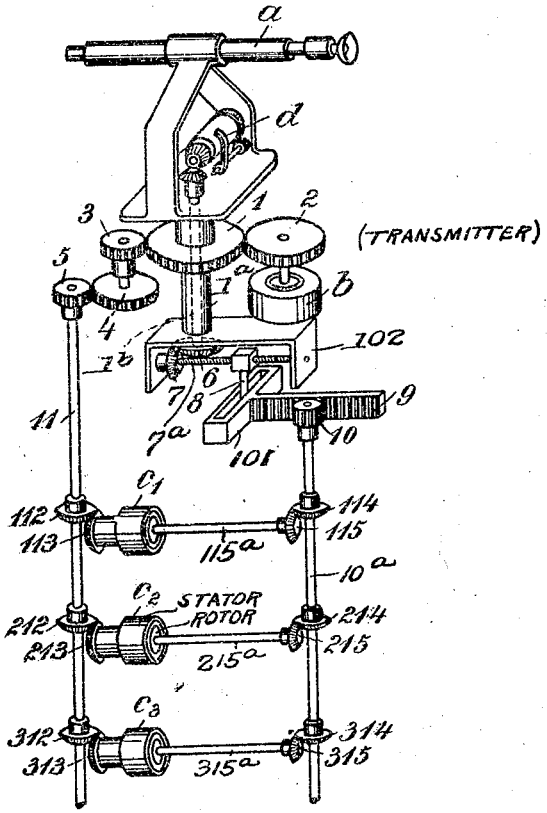

Oct. 7, 1924.  
P. KAMINSKI  
1,510,553  
SYSTEM FOR CONTROLLING AT A DISTANCE GUNS OR OTHER APPARATUS  
Filed Jan. 27, 1921  
3 Sheets-Sheet 2
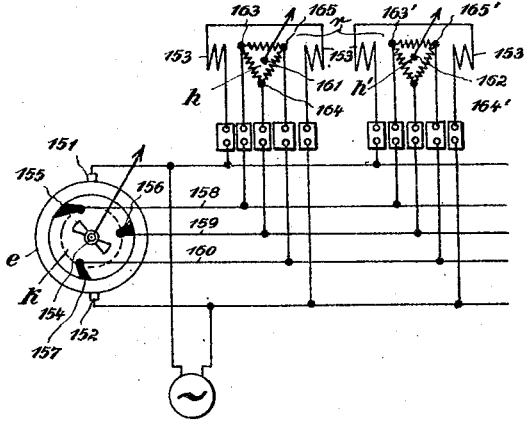
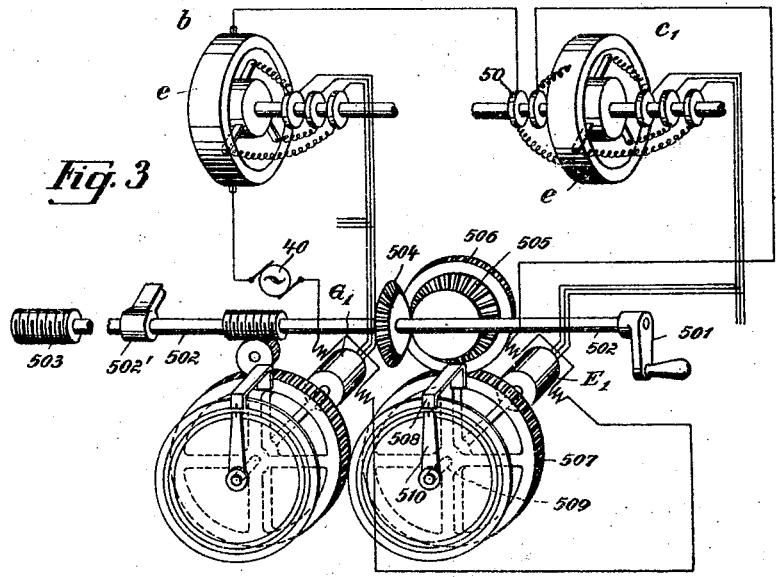
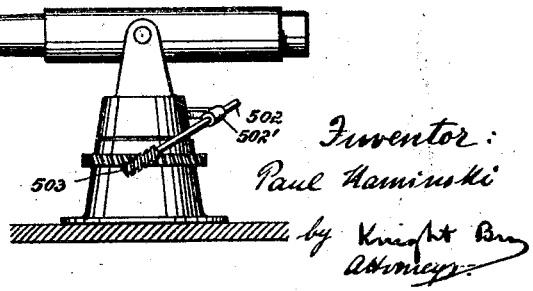
Inventor:  
Paul Kaminski  
by Knight Bro.  
Attorneys Oct. 7, 1924.
P. KAMINSKI
1,510,553
SYSTEM FOR CONTROLLING AT A DISTANCE GUNS OR OTHER APPARATUS
Filed Jan. 27, 1921 3 Sheets-Sheet 3

Inventor:
Paul Kaminski
by Knight Bro
Attorneys

Patented Oct. 7, 1924.

1,510,553

UNITED STATES PATENT OFFICE.

PAUL KAMINSKI, OF BERLIN-PANKOW, GERMANY, ASSIGNOR TO SIEMENS & HALSKE, AKTIENGESELLSCHAFT, OF SIEMENSSTADT, GERMANY.

SYSTEM FOR CONTROLLING AT A DISTANCE GUNS OR OTHER APPARATUS.

Application filed January 27, 1921. Serial No. 440,550.

(GRANTED UNDER THE PROVISIONS OF THE ACT OF MARCH 3, 1921, 41 STAT. L., 1313.)

*To all whom it may concern:*

Be it known that I, PAUL KAMINSKI, a citizen of the German Empire, residing at Berlin-Pankow, Germany, have invented certain new and useful Improvements in Systems for Controlling at a Distance Guns or Other Apparatus (for which I have filed an application in Germany on October 13th, 1916, Patent No. 327,856), of which the following is a specification.

My invention relates to an apparatus for the electrical telecontrol of guns by means of the well known "follow the pointer" principle, the required concentration correction being automatically obtained by my apparatus.

In the electrical signalling systems, having coarse and fine adjustment for the telecontrol of guns or the like to be trained on a target, the necessary concentration correction is generally obtained by mechanical differential gears as shown for example in the German Patents No. 327,851 and No. 327,853. These mechanical differential gears are of a rather complicated construction. The subject matter of the present invention relates to simplification of the construction of such arrangements. For this purpose the transmitters for the fine adjustment themselves are employed as electrical differential gears. With the well known alternating current signal transmitting systems, for example, the stators of the fine transmitters will be rotated for an amount corresponding to the bearing angle, and the rotors of the fine transmitters for an amount corresponding to the concentration correction, or vice versa, the rotors in accordance with the bearing angle, and the stators according to the concentration correction.

In the drawings affixed to this specification and forming part thereof my invention is illustrated in a purely diagrammatic manner.

Figure 5:
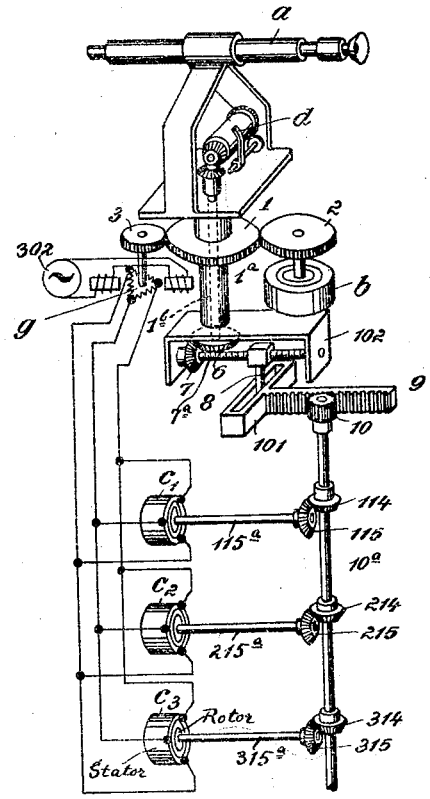

Fig. 1 shows the apparatus which transmits the movement of the governor-telescope to the electric transmitters, Fig. 2 shows the principle of the electric transmission I prefer to use for my invention, Figs. 3 and 4 show the training device of the gun, Fig. 5 shows a form of my invention still further simplified, and Fig. 6 shows the system of connection I prefer for the form described in Fig. 5.

A device of similar character is illustrated in my copending applications, Serial No. 440,551, filed January 27, 1921 and Serial No. 495,290, filed August 25th, 1921. In Fig. 1 $a$ is a governor-telescope mounted in a yoke, which may be trained in any suitable and well known manner, not shown in the figure. This yoke is fixed to a shaft rotatably mounted in the apparatus casing and carries the gear wheel 1. The gear wheel 1 engages the gear wheel 2, the shaft of which is rotatably mounted in the apparatus casing and carries the rotor of the electrical transmitter for coarse adjustment $b$. This transmitter may serve for several objects to be controlled and transmits only the value of the bearing angle, without any further correction, to the electrical coarse receivers of the objects. I shall describe presently by means of Fig. 2 as an example the principle of the electrical transmission, I prefer.

Again referring to Fig. 1, the gear wheel 1, also engages by means of the intermediate gearing 3, 4 the gear wheel 5, the shaft 11 of which also is rotatably mounted in the apparatus casing. Shaft 11 carries the bevel gears 112, 212, 312. . . , engaging the bevel gears 113, 213, 313. . . The bevel gears 113—313 are fixed on shafts mounted rotatably in the apparatus casing, these shafts carrying at one end the stators $c_1$, $c_2$, $c_3$ of the transmitters for fine adjustment. By training the telescope $a$, therefore, the stators of the transmitters for fine adjustment are caused to turn according to the bearing angle.

The value of the concentration correction depends upon (1) the value of the range, (2) the sine of the bearing angle, and (3) the distance from the gun to the governor-telescope, as I have exactly described in my U. S. Patent No. 1,438,832 dated December 12th, 1922. The component of the range is manually adjusted at the drum $d$ gauged according to the distance of the target. The drum is mounted upon the plate of the telescope $a$ and transmits its movement by two bevel gears, by a shaft $1^b$ rotatably mounted within the hollow shaft $1^a$ of the gear wheel 1 and by the bevel gears 6, 7 to the pin 8 threaded on to the spindle $7^a$ of the bevel gear 7. This spindle is rotatably mounted in a yoke 102 mounted on the lower end of shaft $1^a$ of the bevel gear 1. When the drum $d$ is manually rotated, the pin 8 travels on the spindle $7^a$. To correct the concentration correction regarding the sine of the bearing angle, the pin 8 slides in the slot of a sine-link 101 as is described in detail in my aforesaid application, Serial No. 439,649. At right angles to its slot the link carries a toothed rack 9 engaging the gear wheel 10. The link 101 is supported in the apparatus casing in such a manner (not shown) that it can slide only in longitudinal direction of the toothed rack. If the pin 8 describes a full circle by slewing the sighting device $a$, the link 101 will move according to the sine-function of the bearing angle because the perpendicular cosine-function is compensated by the free play of the pin 8 in the slot of the link 101. As the distance of the pin 8 from the center of the shaft of the gear wheel 1 depends upon the distance of the target, the movement of the rack 9 and therefore of the gear wheel 10 is dependent upon the value of the range and the sine of the bearing angle. The third function of the concentration correction, namely the distance from the controlled object to the governor-telescope $a$, individually varying for each object to be controlled, is performed by the different ratios of the bevel gears 114, 115; 214, 215 and 314, 315. The gears 114, 214, 314. . . are fixed to the shaft $10^a$ of the gear wheel 10, while the bevel gears 115, 215, 315. . . are fixed each to a separate shaft $115^a$, $215^a$, $315^a$ rotatably mounted in the apparatus casing, these shafts carrying the rotors of the transmitters for fine adjustment $c_1$, $c_2$, $c_3$.

After having thus described how I transmit the movements of the sighting device to the various transmitters, I shall now explain the fundamental principle according to which I effect the electric transmission from the transmitter to the receivers. The principle of this transmission is shown diagrammatically in Fig. 2.

In the known manner the fields 153 of the receivers $r$ are connected in parallel to the transmitter stator $e$ which is supplied with alternating current through the brushes 151 and 152. The transmitter armature $k$ rotates with its shaft 154 and in the customary manner, receives through its contact brushes 155, 156, 157 voltages of different magnitudes, corresponding to its angular position, from the stator $e$ which is designed as a voltage divider. This stator offers an uninterrupted contact surface to the current collectors and consists of silite-carbon or other material of similarly high specific resistance. The different potentials are conducted in the known manner through the lines 158, 159, 160 to the receiver armatures $h$, $h'$ rotating on the axles 161 and 162, through three pairs of contact brushes each, 163, 164, 165, 163', 164', 165'. The voltage thus transmitted to the receiver armatures causes a current to flow so long as the revceiver positions do not yet register with the position of the transmitter. This current induces a magnetic field in the receivers which moves the receivers into a position corresponding to the position of the transmitter armature. According to their adjustment they are kept in this position so long as the potential is maintained.

In Fig. 3 the coarse transmitter shown in Fig. 1 is represented by $b$, one of the fine transmitters shown in Fig. 1 is represented by $c_1$. The stators of the transmitters and all of the receivers are located in one common alternating current circuit supplied from the source 40. This alternating current is supplied to the rotatable stator of the fine transmitter through slip rings 50 in the customary manner. The rotors of the coarse transmitters are connected to the rotors of the coarse receivers and the rotors of the fine transmitters to the rotors of the fine receivers through a three-wire system, as has been described in connection with Fig. 2. By turning a hand crank 501, the shaft 502 supported on the carriage of the gun in bearings 502' is turned, the end of this shaft carrying a worm 503 which engages a worm gear, thus moving the gun. At the same time the shaft 502 on the fine receiver turns the gear wheel 506 through the bevel gears 504 and 505, the gear wheel 506 engaging the gear wheel 507. Fixed to the gear wheel 507 is the following pointer 508. The gear wheel 507 turns freely upon the shaft 509 which carries the real pointer 510, and which is moved from the rotor of the receiver 511 by means of the electric telecontrol described. The design of the coarse receiver $G_1$ is the same as that of the fine receiver $E_1$, the only difference being that the drive of the following pointer is effected by a worm and worm gear instead of by bevel gears. If the marksman maintains the following pointer so as to register with the pointer by turning the hand crank 501, he transmits at the same time to the controlled object the desired movement through the worm 503 which engages the adjusting mechanism of the controlled object, shown in Fig. 4. These constructional details just described do not form the subject matter of the present application but merely serve to more clearly explain how my present invention is applied. These aforementioned details are more fully set forth in my copending applications Serial No. 495,290 and 440,551 previously referred to.

In the aforementioned example the bearing angle is transmitted to the stators of the transmitting devices $c_1$, $c_2$, $c_3$ by means of bevel gears 112, 113, 212, 213, 312, 313 actuated by a common shaft from the pinion 5. The stators of the individual transmitting devices may also be adjusted by displacing the stator field relatively to the stationary stator by electric means from a common transmitter controlled by the pinion 1, instead of by mechanical means, such as the bevel gears 112, 113, 212, 213, 312, 313 shown in the drawings. In this case these bevel gears as well as their common shaft may be dispensed with, so that an arrangement such as is shown in Fig. 5 results.

In Fig. 5 gear wheel 1 engages gear wheel 3, the shaft of which carries the rotor $g$ of an auxiliary transmitter, rotating in a single phase alternating current field supplied by generator 302. The potential of this rotor $g$ is transmitted by a three-wire system to the fields of the stators $c_1$, $c_2$. . . , inducing for every angular position of the rotor $g$ different voltages in the windings of these stators fixed in the apparatus casing. Instead of the stators being physically rotated, as in the modification Fig. 1, only their magnetic fields are rotated in the form shown in Fig. 5, while the movement of the rotors of the fine transmitters $c_1$, $c_2$, $c_3$ is the same as in the aforementioned form.

I shall now describe by means of the Fig. 6 the system of connection I prefer for this form of my invention.

By rotating the gear wheel 3, Fig. 5, the three phase wound rotor $g$ of the auxiliary transmitter shown at the top of Fig. 6 will rotate a like amount between the two poles 301, the windings of which are fed with alternating current, furnished by the generator 302. The different voltages induced in the rotor $g$ at its different angular positions, relatively to the field are transmitted by the three-phase system shown firstly to the fields of the stators $c_1$, $c_2$, $c_3$ of the fine transmitters (only $c_1$ being shown in Fig. 6), and secondly to the rotors of the receivers $E_1$ near the guns (see Fig. 3), the stators $c_1$, $c_2$. . . of the transmitters and the rotors of the receivers being connected all in parallel. The rotor 303 of the fine transmitter shown in the middle of the Fig. 6, being rotated by the shaft of the bevel gears 115, 215, or 315 (Fig. 5), respectively, is provided with a two pole winding only, whose terminals are connected by two wires with the stator 55 of the receiver $E_1$ corresponding to the individual fine transmitter.

As it is necessary to transmit only the differences of the voltages induced in the fine transmitters to the receivers on the guns, it is obvious that one may connect the three-wire system of the transmitter stator with the stator of the receiver, and to connect mutually the corresponding rotors by the two-wire system.

What I claim is:—

1. An electric signalling system for the telecontrol of guns, or the like having electric transmitters and receivers for coarse and fine adjustment according to the "follow the pointer" principle, each transmitter for fine adjustment having two elements each responsive to a different value of adjustment, a governor-telescope located at the control station and trainable in any suitable manner, means for transmitting the movement value of the governor-telescope in the horizontal plane to one of said elements of said transmitters for fine adjustment and to said transmitter system for coarse adjustment, mechanical means operable by the training of the telescope on the target for correcting the concentration corresponding to the position of each individual gun, mechanical means for transmitting the value of the concentration correction to the other element of said transmitters for fine adjustment, receivers disposed on the guns to be controlled and connected with said transmitters, and means for training the gun according to the "follow the pointer" principle in accordance with the indications given by said receivers.

2. An electrical signalling system for the telecontrol of guns or the like having electric transmitters and receivers for coarse and fine adjustment according to the "follow the pointer" principle, each transmitter for fine adjustment having two elements, each responsive to a different value of adjustment, a governor-telescope located at the control station and trainable in any suitable manner, means for transmitting the movement value of the governor-telescope in the horizontal plane to said transmitter system for coarse adjustment, electrical means for transmitting the said movement of the said telescope to one of said elements of the transmitters for fine adjustment, mechanical means operable by the training of the telescope on the target correcting the concentration corresponding to the position of each individual gun, mechanical means for transmitting the value of the concentration correction to the other element of said transmitters for fine adjustment, receivers disposed on the guns to be controlled and connected with said transmitters, and means for training the gun according to the "follow the pointer" principle in accordance with the indications given by said receivers.

3. An electric signalling system for the telecontrol of guns or the like having electric transmitters and receivers for coarse and fine adjustment according to the "follow the pointer" principle, each transmitter for fine adjustment having a stationary and a rotatable element, each element being responsive to a different value of adjustment, a governor-telescope located at the control station and trainable in any suitable manner, means for transmitting the movement value of the governor-telescope in the horizontal plane to said transmitter system for coarse adjustment, an auxiliary electric transmitter, mechanically acted upon by said telescope, said auxiliary transmitter being connected with the stationary element of the transmitters for fine adjustment and adapted to vary the electrical field of the said element of said fine transmitters, mechanical means operable by the training of the telescope on the target for correcting the concentration corresponding to the position of each individual gun, mechanical means for transmitting the value of the concentration correction to the other element of said transmitters for fine adjustment, receivers disposed on the guns to be controlled and connected with said transmitters, and means for training the gun according to the "follow the pointer" principle in accordance with the indications given by said receivers.

In testimony whereof I affix my signature.

PAUL KAMINSKI.